United States Patent [19]

Gahura et al.

[11] Patent Number: 4,608,880
[45] Date of Patent: Sep. 2, 1986

[54] PUSH PULL MULTIPLIER LINKAGE

[75] Inventors: Andrew Gahura, Colebrook; Graham M. Platt, Avon, both of Conn.

[73] Assignee: Chandler Evans Inc, West Hartford, Conn.

[21] Appl. No.: 667,992

[22] Filed: Nov. 5, 1984

[51] Int. Cl.[4] .......................... G05G 11/00; F02C 9/28
[52] U.S. Cl. ..................................... 74/479; 60/39.281
[58] Field of Search ........................ 74/479, 516, 518; 60/39.281

[56] References Cited

U.S. PATENT DOCUMENTS

| | | | |
|---|---|---|---|
| 2,940,332 | 6/1960 | Teague, Jr. | 74/518 X |
| 3,399,528 | 9/1968 | Warne | 74/479 X |
| 4,088,039 | 5/1978 | Bolang et al. | 74/479 |
| 4,132,126 | 1/1979 | Hussey | 74/479 |
| 4,180,243 | 12/1979 | Hsu et al. | 74/479 X |
| 4,362,067 | 12/1982 | Earl et al. | 74/479 |

Primary Examiner—Allan D. Herrmann
Attorney, Agent, or Firm—Radford W. Luther; Richard A. Dornon

[57] ABSTRACT

A mechanical multiplier (25) in a fuel control for a gas turbine engine has a first track member (26) mounted for lateral movement and a first axially movable displacement member (34) connected to the first track member. A second track member (42) is mounted adjacent the first track member for pivoting movement about an axis (52). A follower assembly (54) operatively interconnects the track members and has rollers (120,122) respectively received in the tracks of the first and second track members. A second displacement member (55) is connected to the follower assembly for movement generally perpendicular to the direction of lateral movement of the first track member. The second displacement member is connected to the output piston (65) of a pressure transducer (66) which senses compressor discharge pressure; and the first displacement member is operatively connected to a fuel metering valve (100). The angular position of the second track member with respect to the first track member represents a set ratio (W/P) of fuel flow (W) to compressor discharge pressure (P).

7 Claims, 8 Drawing Figures

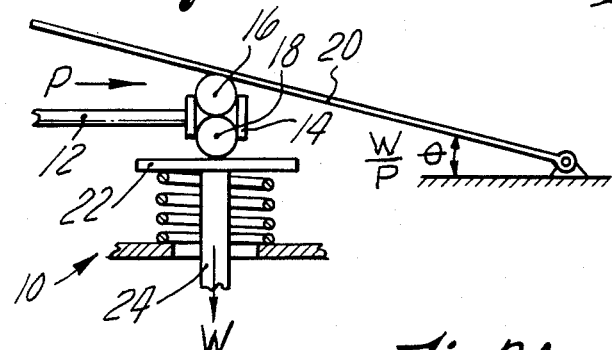
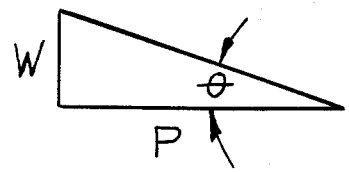
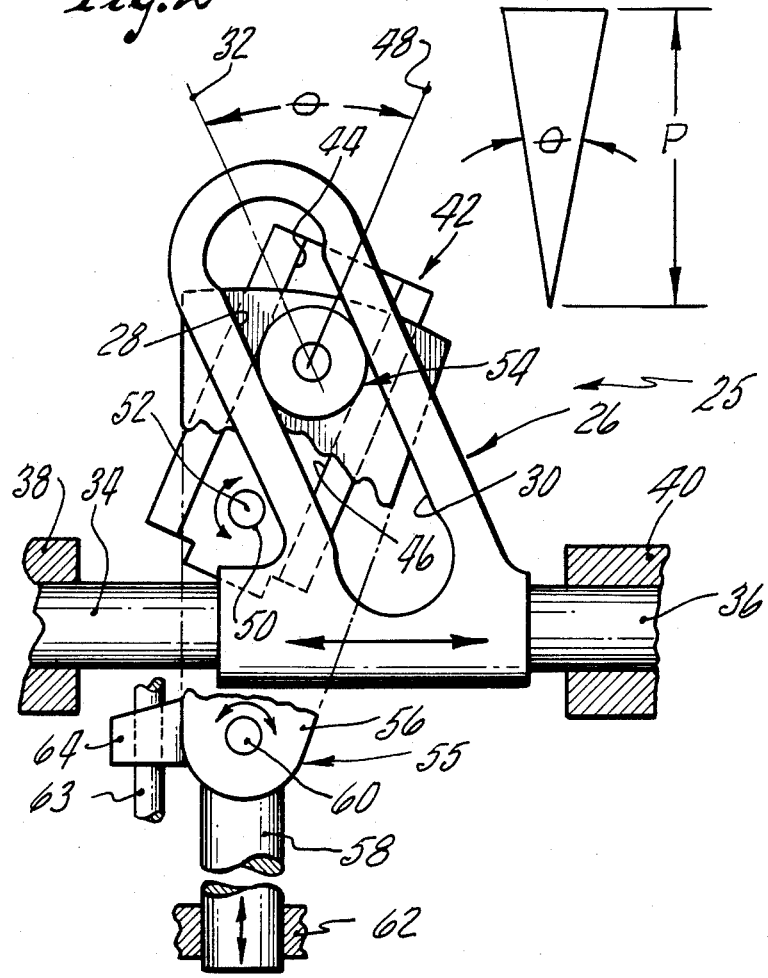

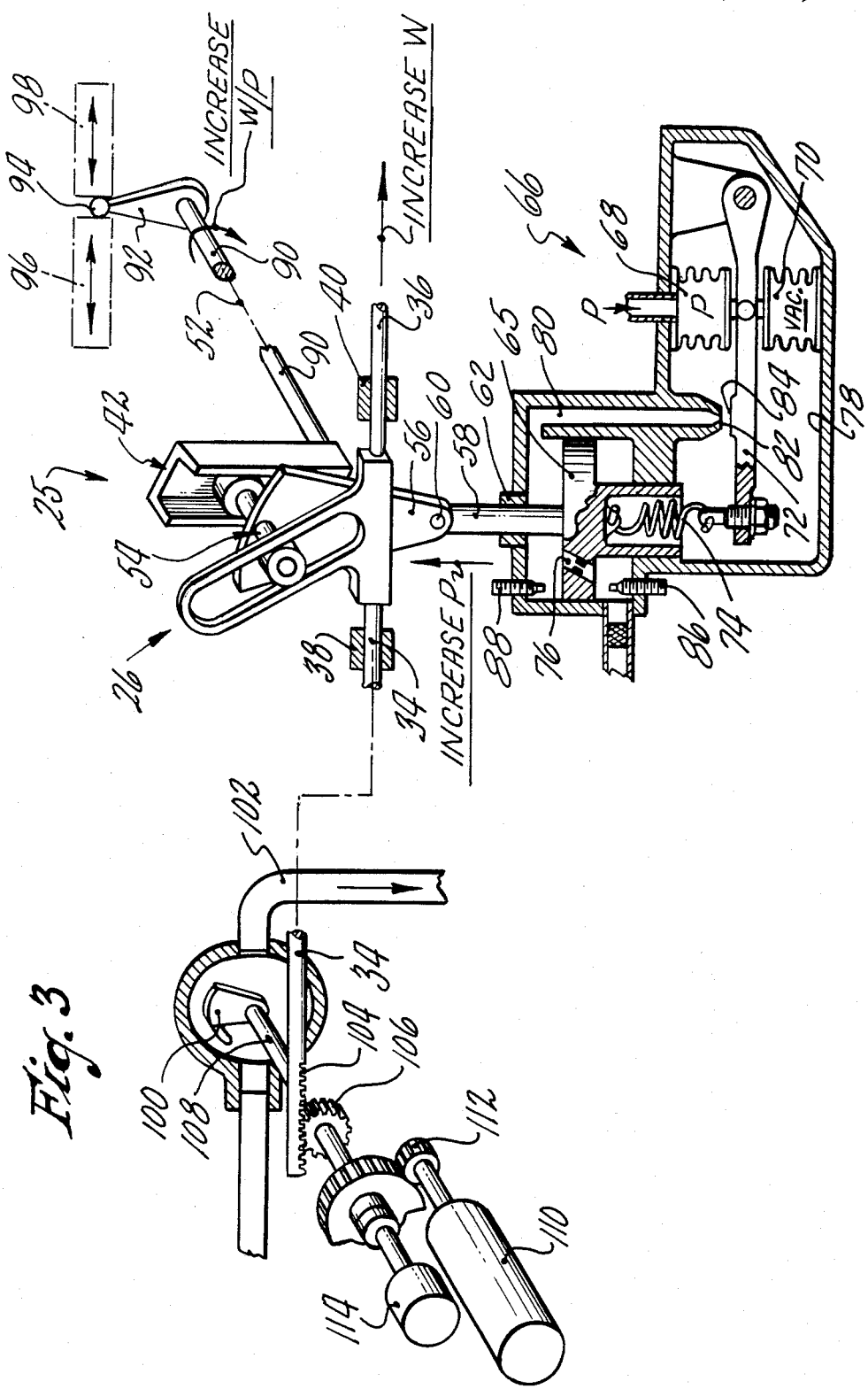

PUSH PULL MULTIPLIER LINKAGE

TECHNICAL FIELD

This invention relates generally to mechanical multipliers, and more particularly to those multipliers employed in hydromechanical fuel controls for gas turbine engines.

BACKGROUND ART

Various forms of mechanical multipliers are known in the prior art. In general, existing mechanical multipliers utilize a spring which requires an input force capable of overcoming its bias. Moreover, such existing mechanical multipliers suffer from sliding friction.

DISCLOSURE OF THE INVENTION

In accordance with the invention, there is provided a mechanical multiplier having a translating track member and a rotatable track member with a track follower assembly interconnecting the tracks. Displacement members are respectively connected to the two tracks for transmitting motion between the tracks and selected elements. In addition, a displacement member is connected to the track follower assembly for transmitting motion between the follower assembly and yet another selected element. A mechanical multiplier of the invention need not incorporate any springs, thereby permitting a significant reduction in input forces to the appropriate displacement members and attainment of a higher output force. Moreover, a mechanical multiplier of the invention may employ rollers in the follower assembly whereby sliding friction between the follower assembly and the tracks may be substantially eliminated.

Accordingly, it is a primary object of the invention to provide a mechanical multiplier which need not incorporate springs.

Another object is to provide a mechanical multiplier having minimal sliding friction.

These and other objects and advantages of the invention will become more readily apparent from the following detailed description when taken in conjunction with the accompanying drawings, in which:

BRIEF DESCRIPTION OF DRAWINGS

FIG. 1 is a schematic view of a classical tangent multiplier.

FIG. 1A is a simplified diagram of displacements occasioned in the tangent multiplier of FIG. 1.

FIG. 2 is a schematic view of a mechanical multiplier of the invention.

FIG. 2A is a simplified diagram showing the displacements occasioned in the multiplier of FIG. 2.

FIG. 3 is a fragmentary schematic representation of a fuel control for a gas turbine engine incorporating a multiplier of the invention.

BEST MODE OF CARRYING OUT THE INVENTION

Figure 4:
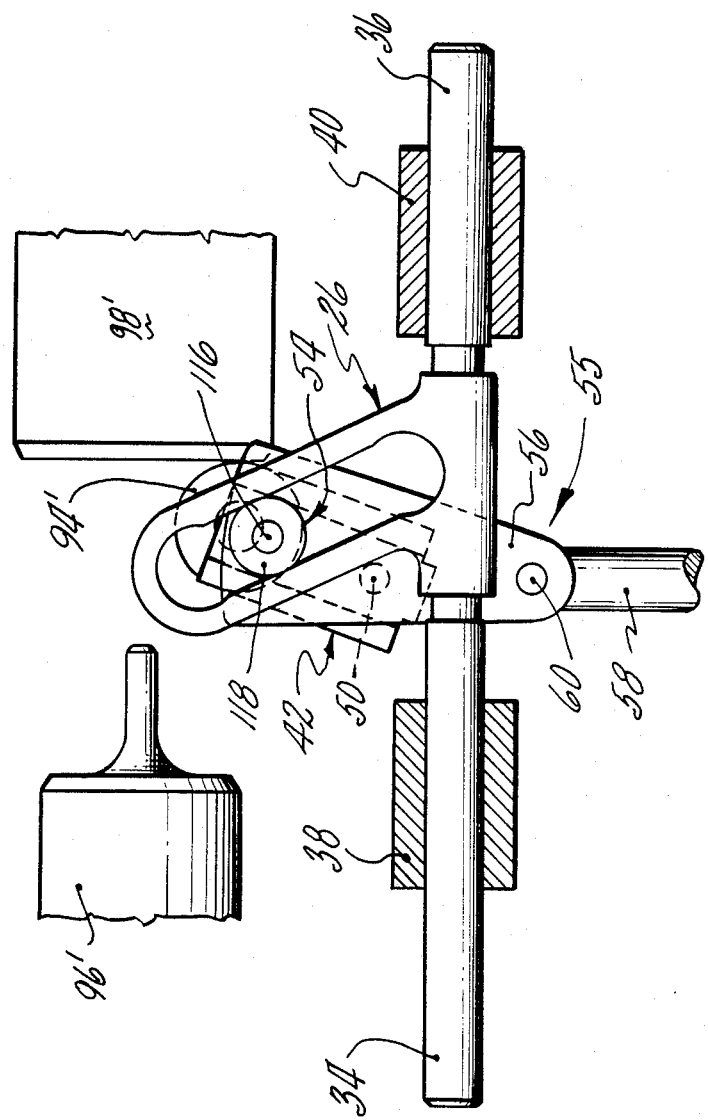
FIG. 4 is a front elevational view of a first embodiment of a multiplier of the invention disposed in a fuel control housing.

Referring to the drawings wherein like elements are designated by like primed numerals and more particularly to FIG. 1, there is shown a classical tangent multiplier, generally indicated at 10, various versions of which have been used for many years to make mechanical computations. The multiplier 10 is generally constituted by an input shaft 12 having a track 14 at its inner end in which balls 16 and 18 are partially contained for vertical movement. The upper ball 16 has a lever 20 resting thereupon which makes an angle with the horizontal. The lower ball 18 rests upon the upper surface of a spring loaded plate 22 which has an output shaft 24 depending therefrom.

In a typical gas turbine fuel control application the position of the shaft 12 represents compressor discharge pressure P and the position of the shaft 24 represents fuel flow W. Angle $\theta$ represents the fuel flow to compressor discharge ratio W/P. With reference to FIG. 1A, it will be seen that since Tan $\theta$ is equal to W/P and $\theta$ is approximately equal to W/P for reasonably small angles (e.g., less than 25°), W is equal to $P \times \theta$. Hence, if P and $\theta$ (W/P) are inputs to the multiplier 10, P and $\theta$ will be multiplied by the multiplier 10 to and yield an output in the form of a displacement of the shaft 24 equal to W. The displacements of the shaft 24 could, for example, be used in a fuel control to position a metering valve for regulating fuel flow to the gas turbine engine.

FIG. 2 shows a multiplier of the invention, generally shown at 25, in front elevation. A first track member 26, shaped as an elongated loop extending from a base 27 has a first track or slot defined by parallel sidewalls 28 and 30 having an axis 32. The track member 26 has its sides connected to displacement members 34 and 36 which are constituted by shafts slidable within bushings 38 and 40. It will be noted that the axis is inclined at a small angle (e.g., 25°) to the vertical and is only capable of lateral translation.

A second track member 42 of generally rectangular shape is mounted adjacent the first track member and has a second track or slot formed therein which is defined by parallel sidewalls 44 and 46. The second track of track member 42 has an axis 48 which extends through a pivot pin 50 having a fixed lateral and vertical position. The track member 42 is thus mounted for pivoting or rotational movement about a fixed axis 52 perpendicular to the plane of the paper. The second track member may be pivoted about axis 52 through a small angle (e.g., 25°) measured clockwise from the vertical and another small angle (e.g., 25°) measured counterclockwise from the vertical for a total angular pivoting range which could, for example, be of the order of 50°.

The track members 26 and 42 are interconnected by a follower assembly 54 which is received within the first and second tracks of the respective track members 26 and 42 for sliding movement therein or, alternatively, rolling movement therein should the follower assembly 54 include rollers, which is a preferable construction.

The follower assembly 54 has an articulated displacement member 55 connected thereto which comprises sector-shaped shaft 56 and shaft 58 and an interconnecting joint 60. As shown in FIG. 2, the axis of the shaft 58 intersects and is orthoginal to the axis 52 about which track member 42 pivots. The shaft 58 is mounted within a bushing 62 for vertical sliding movement which begets generally corresponding movements of the follower assembly 54. A pin 63 is confined in the slot of a bifurcated flange 64 extending from the shaft 56 to forestall any rotational movement about a vertical axis.

In FIG. 2, the vertical position of displacement member 55 and follower 54 may be regarded as the quantity P (e.g., compressor discharge pressure) while the lateral position of the displacement member 34 may be regarded as the quantity W (e.g., fuel flow). As illustrated in FIG. 2A, the angle $\theta$ which is the angle between the axis 32 and 48 of the respective tracks may be regarded as the ratio W/P, i.e., $\theta$ is equal to W/P.

It is important to note that when the track member 42 is rotated to a position where $\theta$ is equal to zero and the axis 32 and 48 are coincident, W/P will be equal to zero and vertical movements of the displacement member 55 cannot effect any lateral displacement of the track member 26 or its displacement member 34. It should also be noted that when the follower assembly 54 has its axis aligned or coincident with the axis of pivoting 52 of the track member 42, P will equal zero and pivoting of the track member 42 cannot produce any lateral displacement of the track member 26 or its displacement member 34. In summary, when $\theta$ and P are inputs to the multiplier 25 of FIG. 2, they will be multiplied to yield a displacement W which is equal to $\theta \times P$.

Essentially the same inaccuracies are inherent in a multiplier as shown in FIG. 2 as in a prior art tangent multiplier as will be appreciated by those skilled in the art. However, by slanting the track member 26 to one side of the vertical, as illustrated, and by slanting the track member 42 to the other side of the vertical for a maximum $\theta$, as illustrated, errors can be minimized in much the same way as errors can be reduced in a tangent multiplier. Moreover, errors can be minimized by increasing the length of the shaft 56.

For purposes of understanding operation of the multiplier of FIG. 2, assume that the track 42 is in the illustrated position and P increases so as to vertically move the displacement member 55 and the follower assembly 54 upwardly. The follower assembly 54 will be constrained to follow the second track of track member 42, thereby laterally moving track member 26 to the right by virtue of the engagement between the follower assembly 54 and the sidewall 30. This, of course, results in a rightward displacement of displacement member 34 which represents an increase of value of W which will be approximately equal to $\theta \times P$, with P being at its increased value. Conversely, downward movement of the displacement member 55 causes the follower assembly 54 to slide along the sidewall 28 of the track member 26, thereby resulting in a leftward displacement of the displacement member 34 and a decreased value of W. Assuming, a constant P or vertical position of displacement member 55 and the follower assembly 54, clockwise rotation of track member 42 will result in an increased $\theta$ or W/P ratio and counterclockwise rotation of track member 42 will result in a decreased $\theta$ or W/P ratio. Such aforementioned rotational movements of the track member 42 will cause the follower assembly to displace the displacement member 34 laterally in respective right and left directions by pushing engagement with the sidewalls 30 and 28 of the track member 42. During these latter mentioned movements, the sidewalls 44 and 45 of the pivoting track member 42 will, of course, bear against and push the follower assembly 54 to the right and left, respectively. Simultaneous movements of the track member 42 and the displacement member 34 will affect appropriate displacements of the displacement member 34. It will be understood that the multiplier 25 could be operated so that any two of the quantities P, W and $\theta$ are inputs and the remaining quantity an output.

FIG. 3 shows the multiplier 25 incorporated in a fuel control housing for a gas turbine engine. However, it will be understood that a multiplier of the invention may find utility in other devices. The shaft 48 is connected to the output piston 65 of an old and well known type of pressure transducer, generally shown at 66, which of the force balance variety. Its construction and operation will thus be discussed succinctly hereinafter.

Pressure P (compressor discharge pressure) is directed to a bellows 68 which is connected to an evacuated bellows 70. The interconnection between the bellows is attached to an intermediate station on a pivotally mounted arm 72 which has its extremity connected to a feedback extension spring 74. The other end of the feedback spring 74 is secured to the undersurface of the piston 64. A high fuel pressure is posted to the undersurface of the piston 64 which embodies a restricted passage 76 for establishing fluid communication between the upper and lower surfaces of the piston. The cavity 78, in which the arm and bellows are mounted, is referenced to a lower fuel pressure (e.g., boost pressure) and communicates with the volume adjacent the upper surface of the piston 65 via a conduit 80 having a narrowed outlet 82. The outlet 82 is covered by a surface 84 on the arm 72 to thereby define a variable restriction. The movements of the arm 72 in restricting flow are extremely small and may be neglected. In response to the changes in pressure P, the piston will move in proportion thereto such that the moments engendered by the bellows 68 and the spring 74 upon the arm 72 are equal. Hence, the movements of shaft 58 will be in proportion to pressure changes and its position may be regarded as the quantity P. It should also be observed that minimum and maximum stops 86 and 88 are furnished to provide lower and upper limits of the value P.

Rotational movement is imparted to the track member 42 by a displacement member in the form of a rod 90 which has an arm 92 mounted thereupon with a roller at its extremity 94. The roller 94 is adapted to be trapped between two pistons 96 and 98 of a motion transmitting device which translate laterally in unison and whose position represents a commanded W/P ratio. A device having two such pistons, capable of setting a desired W/P ratio and transmitting that setting to the track member 42 is described in detail in U.S. patent application No. 06/546,567 filed Oct. 28, 1983 and entitled: Manual Backup for Electronic Fuel Control.

The axial movements of the displacement member 34 during manual fuel control operation are adapted to vary the position of a sliding-plate type metering valve 100 which controls the flow of fuel through a main fuel supply conduit 102. Upon displacement member 34, there is provided a rack 104 which meshes with a pinion 106 mounted upon a shaft 108 connected to the valve 100. During normal fuel control operation, the metering valve 100 is positioned by a stepper motor 110 which receives its commands from an electronic computer (not shown). The output shaft of the stepper motor 110 carries a gear 112 which meshes with a sector gear 114 mounted upon the shaft 108. Position feedback is provided by a potentiometer 114 connected to the shaft 108.

Figure 5:
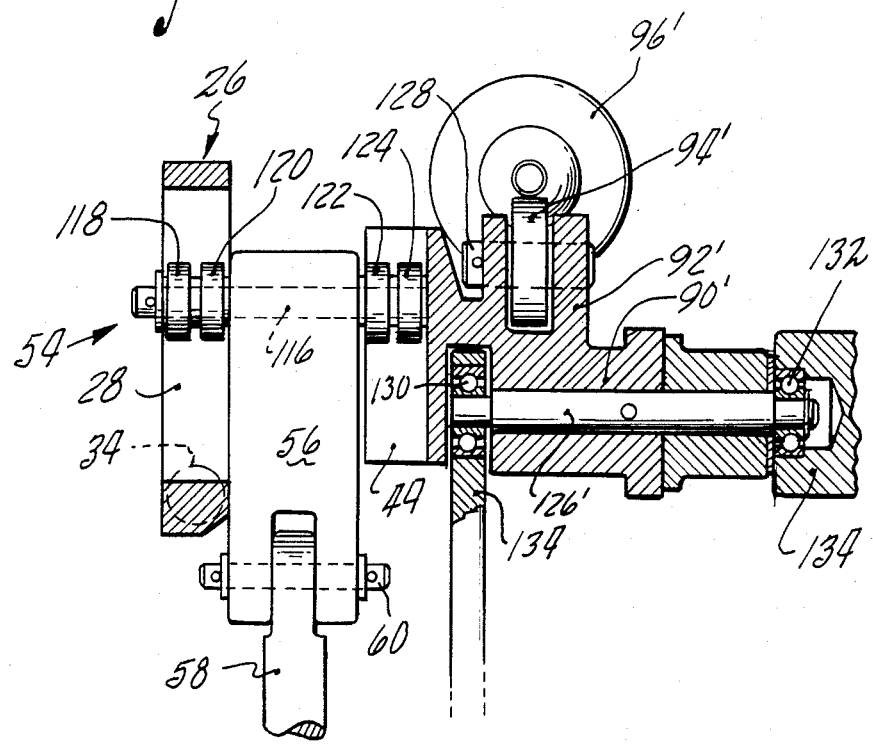
FIG. 5 is a side elevational view of the multiplier of FIG. 4.

FIGS. 4 and 5 feature an embodiment of the invention disposed in a fuel control housing. As shown in FIGS. 4 and 5, the follower assembly 54 extends through sector-shaped shaft 56 which arrangement is depicted in perspective in FIG. 3. It will also be noted that the follower assembly 54 is constituted by a shaft 116 fixedly secured to the sector-shaped shaft 56 and having rollers 118 and 120 mounted at the left end (FIG. 4) and rollers 122 and 124 mounted at the right end. Rollers 118 and 120 move within track member 26 whereas rollers 122 and 124 move within track member 25. The diameters of the respective rollers are, of course, just slightly less than the track widths whereby no sliding friction will be engendered.

As best shown in FIG. 5, a rod 90' is carried by a shaft 126 which is fixedly connected thereto and an arm 92' is bifurcated such that the roller 94' (which may be trapped between two pistons 96' and 98') is supported between the bifurcations upon a pin 128. As also depicted in FIG. 5, the shaft 126 is supported for rotation within bearings 130 and 132 mounted in the fuel control housing 134.

Figure 6:
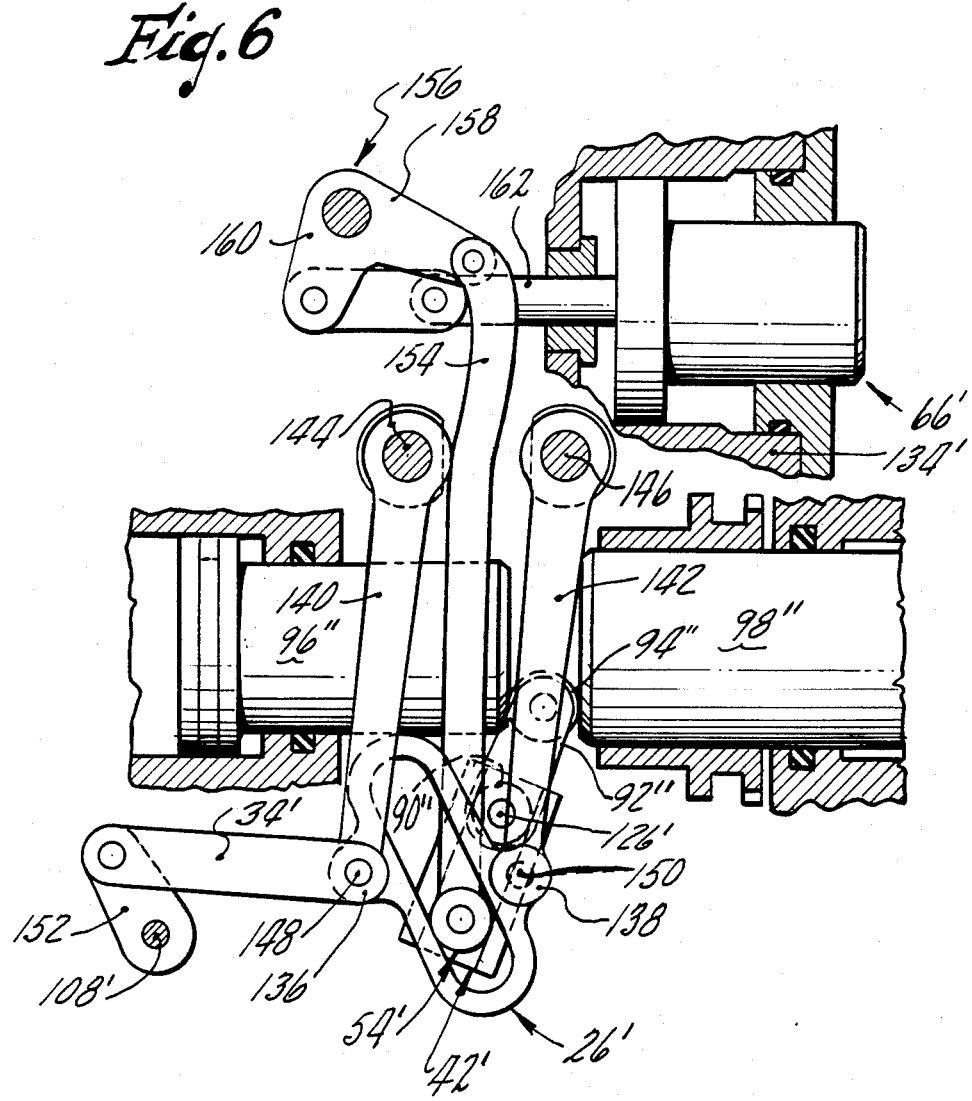
FIG. 6 is a front elevational view of a second embodiment of a multiplier of the invention.

In FIG. 6, another form of multiplier of the invention in a fuel control housing 134' is illustrated. A first track member 26', similar to track member 26, but having rounded lateral extensions 136 and 138, is suspended for lateral translation by spaced levers 140 and 142. Levers 140 and 142 are mounted for pivoting movement about respective pins 144 and 146 projecting from the housing 134' and are connected to the rounded lateral extensions 136 and 138 of the track member 26' by respective interconnecting pins 148 and 150. A displacement member 34' is connected to the pin 148 for transmitting lateral movements of the track member 26' to a link 152 wich may be mounted upon a shaft 108' adapted to position a metering valve (not shown).

A second track member 42' is mounted for rotation about the axis of shaft 126', which is rotatably mounted in housing 134' and carries a rod 90" having an arm 92" integral therewith. Arm 92", in turn, supports a roller 94" shown confined between two pistons 96" and 98". A follower assembly 54', similar to that shown in FIG. 5, interconnects the track members 26" and 42" and is received within the tracks of the respective track members.

A displacement member 154, connected to the shaft 116' of the follower assembly 54', controls the vertical position of the follower assembly 54' in response to changes in compressor discharge pressure P. The displacement member 154 is positioned by a bellcrank 156, an arm 158 of which is pivotally connected to the upper extremity of the displacement member 154. The other arm 160 of the bellcrank 156 is pivotally connected to an articulated output shaft 162 of a pressure transducer 66'. The multiplier embodiments of FIGS. 4–6 operate in a manner similar to that described with reference to FIGS. 2 and 3 as will be appreciated by those skilled in the art. With respect to the embodiment of FIG. 6 it will be appreciated that multiplication accuracy is enhanced by maximizing the lengths of the levers 140 and 142.

Obviously, many modifications and variations are possible in light of the above teachings without departing from the scope or spirit of the invention as defined in the subjoined claims:

We claim:
1. A mechanical multiplier comprising:
a housing;
a first track member having a first track located in the housing;
first means for mounting the first track member for translation;
a first displacement member connected to the first track member;
a second track member having a second track located in the housing adjacent the first track member;
second means for mounting the second track member for pivoting movement about an axis;
a follower assembly operatively interconnecting the first and second track members and received within the tracks thereof;
a second displacement member connected to the follower assembly; and
third means for mounting the second displacement member for movement transverse to the direction of translation of the first track member.

2. A mechanical multiplier, as defined in claim 1, wherein the follower assembly comprises:
a shaft;
a roller mounted at one end of the shaft in engagement with the first track; and
a roller mounted at the other end of the shaft in engagement with the second track.

3. A mechanical multiplier, as defined in claim 1, wherein the first means comprises:
a pair of spaced levers mounted in the housing for pivoting movement and pivotally connected to the first track member.

4. A mechanical multiplier as defined in claim 1, wherein the second means comprises:
a rod connected to the second track member for pivoting movement therewith, the rod being mounted in the housing for pivoting movement about the axis of pivoting of the second track member; and wherein the mechanical multiplier further comprises:
an arm fixedly connected to the rod; and
a roller mounted upon the arm for engagement by a motion transmitting device.

5. A mechanical multiplier, as defined in claim 1, wherein the second displacement member comprises:
two shafts, one of the shafts being connected to the follower assembly; and
an interconnecting joint for joining the two shafts in articulated relationship.

6. The mechanical multiplier, as defined in claim 1, wherein the first track is slanted to one side of a line perpendicular to the direction of translation and wherein the second track is oppositely slanted to one side of a line perpendicular to the direction of translation at a maximum input to the second track member.

7. The mechanical multiplier, as defined in claim 1, wherein first means comprises:
two bushings, the first displacement member being slidably received within one of the two bushings.

* * * * *